Jan. 6, 1948. A. J. SEITZ 2,434,231
METHOD OF MANUFACTURING CAST VINYL RESIN FILM, SHEETING, AND THE LIKE
Filed Dec. 26, 1944
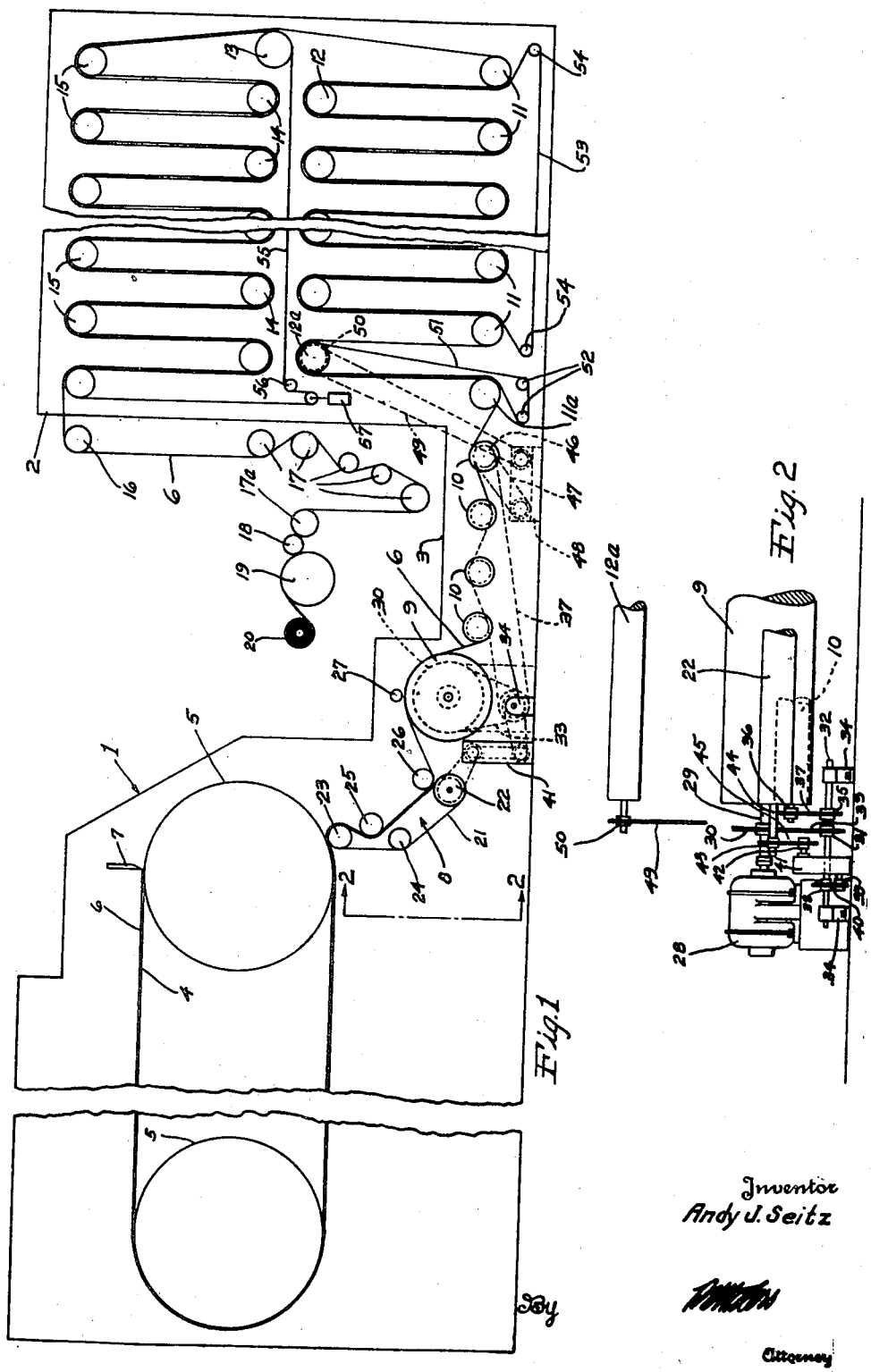
Inventor
Andy J. Seitz
By
Attorney Patented Jan. 6, 1948

2,434,231

UNITED STATES PATENT OFFICE 2,434,231

METHOD OF MANUFACTURING CAST VINYL RESIN FILM, SHEETING, AND THE LIKE

Andy J. Seitz, Akron, Ohio, assignor to Wingfoot Corporation, Akron, Ohio, a corporation of Delaware Application December 26, 1944, Serial No. 569,821

2 Claims. (Cl. 18—57)

The instant invention relates to a method of manufacturing cast film, sheeting and the like from vinyl type resins according to a continuous process. More particularly, the invention is directed to a novel method of removing the cast vinyl resin film from the film-forming surface upon which it is deposited.

The growing commercial importance of vinyl type resin films, sheeting and other attenuated products has emphasized the imperativeness of developing practical manufacturing technique which will insure the production of a uniform high quality product. The inventive concept hereinafter disclosed is particularly advantageously adapted to be employed in the manufacture of cast sheets formed from such synthetic resins as polyvinyl chloride, polyvinyl acetal and copolymers of vinyl chloride and other olefinic compounds such, for example, as vinyl acetate, methyl methacrylate, vinylidene chloride, methyl fumarate, ethyl maleate, and ethyl acrylate.

In the production of such films by the customary endless belt or wheel casting operations, serious difficulty has been experienced in removing the material from the film-forming surface on which it is cast. Vinyl resin films possess certain peculiar physical and chemical characteristics as a result of which they exhibit a marked tendency to adhere to the film-forming surface upon which they are cast resisting all efforts to strip them off the surface by customary methods. Thus, when a conventional stripper roll is employed to remove the film, tension is exerted upon the film to an extent such that it is caused to stretch out of shape with a resultant narrowing in its lateral dimension.

Moreover, the tension applied to the film incident to its removal from the surface upon which it is deposited must of necessity be applied at a stage in the operations when there is present in the film a considerable quantity of solvent. The film is, therefore, in its weakest or most elastic state at this time. This induced stretch in the film creates further difficulties in the subsequent stages embodied in its production and will ultimately affect the quality of the finished product.

This invention has for its object the provision of a method of manufacturing vinyl resin film and the like according to which the film is subjected only temporarily to tension which is just sufficient to overcome the tendency of the material to adhere to the moving film-forming surface upon which it is disposed and, thereafter, releasing this tension whereby the film will be permitted to regain its original cast dimensions.

It is a further object of the invention to provide in furtherance of the manufacturing process, a novel method for removing the cast film from the moving film-forming surface with a minimum of tension, thereafter supporting and transferring the film to a take-up device which operates to release the tension induced in the film in the course of its removal.

A still further object of the present invention is to provide a novel yet simple and efficient method of manufacturing cast film, sheeting, and the like of vinyl-type resins which will facilitate the production of a uniform high quality product.

The aforementioned objects of the invention in addition to other objects which will become apparent as the description of one of the preferred forms of apparatus for carrying out the process proceeds are achieved by the application of a series of steps involving removing the cast film from the moving film-forming surface by subjecting the film temporarily to a minimum of tension sufficient to overcome its tendency to adhere to the surface and thereafter permitting it to relax so as to approach its original cast dimensions.

It will be readily understood that the principles of the present invention are equally advantageously applicable to other analogous processes devoted to the production of cast film, sheeting and the like which possess a high degree of affinity for the surface upon which it is disposed in the forming operations.

For a better understanding of the invention reference should be had to the accompanying drawing in which Figure 1 is a diagrammatic representation of a vertical section taken through a conventional form of apparatus embodying a casting apparatus and its associated dryer unit. Figure 2 is an end elevation, with parts broken away, of the driving apparatus for the stripping element as seen from line 2—2 of Figure 1.

A typical form of apparatus to which the teachings of the present invention are particularly advantageously adapted to be applied is shown diagrammatically in Figure 1 of the drawings as embodying, in general, a housing 1 for the casting mechanism, a dryer case 2 and an interconnecting enclosure 3. In the housing of the casting mechanism is disposed an endless casting belt 4 supported and driven by spaced driving drums 5. The casting belt 4 has a specially treated film-forming surface upon which a thin sheet or film 6 of a vinyl type resin is spread by means of a spreader knife 7 capable of adjustment with respect to the surface of the casting belt 4 to produce a product of the desired thickness.

In accordance with the operating procedure of the apparatus, the film 6 is temporarily supported on the film-forming surface of the casting belt 4, removed therefrom by a suitable stripper assembly designated generally by reference character 8, transferred to ironer roll 9 and supported on each of a series of rolls 10 which carry the film through the connecting enclosure 3 into the dryer case 2. The dryer case 2 embodies a large number of rolls 11 and 12 arranged in successive relation to each other in the lower deck to which the film is passed from associated rolls 11a and 12a, a transfer roll 13 and a series of similarly arranged rolls 14 and 15 in the upper deck. All of said rolls are positively driven in a manner to be more fully described hereinafter to support and advance the film in a continuous travelling sheet through the dryer case 2.

From the dryer case 2, the film 6 passes over a water-cooled roll 16 mounted exteriorly of said case and thence over a series of guide rolls 17 about the anvil roll 17a against which it is trimmed, the bite roll 18 and the presser roll 19 to be collected on a suitable wind-up or collecting device 20. The collecting device 20 may employ a demountable core or other suitable readily maneuverable means for collecting the finished film in package form.

The stripper assembly 8, which embodies the teachings of the present invention, comprises an endless belt 21 which passes about the drive roll 22, stripper roll 23 and tension roll 24. The belt 21 is substantially equal in width to the lateral dimension of the casting belt 4 and is preferably so disposed in passing over the stripper roll 23 that its film-supporting surface approaches frictional engagement with the film-forming surface of said casting belt 4.

It has been found that the cast film can be removed from the film-forming surface of the casting belt 4 most successfully, by so placing the belt 21 of the stripper assembly 8 that its film-supporting surface is just out of frictional engagement with the surface of the casting belt. The preferred spacing between the two surfaces is of the order of a small fractional part of an inch such, for example, as from $\frac{1}{16}$ to $\frac{1}{4}$ of an inch. In any event, it is desirable to keep this clearance to a minimum so as to avoid narrowing of the film by the tension created by the stripping operation. In short, the greater the span over which the stripping tension is exerted, the greater the reduction in the lateral dimension of the film becomes.

One pass of the belt 21 between the drive roll 22 and the stripper roll 23 is in contact with a bite roll 25 and let-off roll 26 from the latter of which the film 6 passes to the ironer roll 9 being held in place on said ironer roll as by means of the bite roll 27. A motor 28 mounted in any suitable fashion is directly coupled to the shaft 29 supporting the ironer roll 9. A sprocket 30 is secured to shaft 29 and serves to drive a sprocket 31 mounted upon a jack shaft 32 through the chain 33. The jack shaft 32 may advantageously be rotatably supported at its ends in the bearing brackets 34 which are attached in any suitable manner to the floor within the housing of the casting mechanism 1. A sprocket 35 on jack shaft 32 operates to drive the several rolls 10 through a corresponding number of sprockets 36 interconnected by the chain 37.

Sprocket 38 on the jack shaft 32 drives a sprocket 39 through the chain 40. The sprocket 39 is mounted on the input shaft of a suitable change speed mechanism such, for example, as the Reeves drive unit 41. The Reeves drive unit 41 carries a sprocket 42 on its output shaft which actuates a sprocket 43 mounted on the shaft 44 carrying the drive roll 22 of the stripper assembly 8 through the chain 45. The drive roll 22 which operates the belt 21 is driven at any desired speed with respect to the speed of the ironer roll 9.

It will be understood that the driving drums 5 may be driven as by means of a standard direct current type motor (not shown). The motor 28 operating the ironer roll 9, the one or more motors (not shown) employed in driving the various groups of the rolls 11 to 15, inclusive, in the dryer case 2 and the drive motor (not shown) for the collecting device 20 may likewise be of the type operating on direct current. The operation of the several motors is advantageously controlled by a slow-fast switch which governs a motor driven rheostat (not shown) for regulating the direct current voltage supplied to the several motors. This driving arrangement makes possible the governing of the operating speed of the entire system while maintaining the original differential speeds between the elements in the system.

The drive for the several groups of rolls in the dryer case 2 may be achieved in any of several different ways. One form of drive is indicated in Figure 1 as including a sprocket 46 associated with the last supporting roll 10 adjacent to the dryer end of the connecting enclosure 3 which is connected as by means of a chain 47 with a suitable sprocket on the input shaft of a change speed mechanism or Reeves drive unit 48. The output shaft of the Reeves drive unit 48 is provided with a sprocket which is interconnected by means of a chain 49 with a sprocket 50 secured to the roller 12a in the dryer case 2 permitting an adjustable speed differential to be maintained between the roll 12a and the several rolls 10.

The roll 12a is advantageously adapted to drive the roll 11a through the medium of a rope, tape or belt drive, such as the tape 51 urged against the driving surface of roll 11a by a pair of guide pulleys 52. The remaining rolls 11 and 12 in the lower bank in dryer case 2 may be driven from the roll 12a through a suitable change speed mechanism such, for example, as a conventional PIV unit or the like (not shown). The several rolls 11 and 12 are actuated by the belt or tape 53 which is guided about the driving surfaces of the several rolls with the aid of pulleys 54.

The rolls 13, 14 and 15 may, if desired, all be driven by a single endless belt 55 which passes over a pulley 56 and is adapted to be tightened by a weight 57 suspended in a loop of said belt 55. One of the rolls in this group including rolls 13, 14 and 15 may be driven from a motor and speed change mechanism (not shown) or the group of rolls may be subdivided into two or more cooperating groups of rolls which are driven independently and at slightly different rates to compensate for the shrinkage of the film as it is advanced through the dryer case 2.

The preferred operation of the stripper assembly 8 is such that the surface speed of the belt 21 as adjustably regulated by the Reeves drive unit 41 will be greater than the surface speed of the casting belt 4. The speed of the ironer roll 9 which is driven direct by the motor 28 is advantageously substantially the same as that of the casting belt 4. The result of these driving relationships is, therefore, such that the belt 21, which frictionally engages the cast film 6 on casting belt 4, will tend to disengage the film by introducing tension and a consequent slight longitudinal stretch thereinto. This tension is released at the let off roll 26 where the film is transferred from moving surface of belt 21 to the ironer roll 9.

The operation of the rolls 11a and 12a is such that, as the film is introduced to the dryer case 2, there will be a controlled advance of the film 6 which allows for a slight relaxation or shrinkage of the film. The drive for the remaining rolls 11 and 12 in the lower bank and that for the one or more groups of rolls 13, 14 and 15 in the upper deck is so adjusted that a progressive relaxing of the tension in the film 6 may take place permitting a controlled substantially tensionless shrinkage of the film during the drying operation.

It will be readily understood that many modifications may be embodied in the apparatus of the present invention without affecting the scope or spirit of the invention. The drive for each roll in the dryer case 2 may, if desired, be controlled in such manner that each successive roll travels at a slightly lower rate of speed than its predecessor whereby a completely tensionless shrinkage of the film may take place without, however, allowing the film to sag unduly. Other modified forms of drive and different structural arrangements may be introduced in the stripper assembly 8 without affecting its principle of operation.

While in accordance with the patent statutes one best known embodiment of the invention has been illustrated and described in detail, it is to be particularly understood that the invention is not limited thereto or thereby, but that the inventive scope is defined in the appended claims.

I claim:

1. The method of manufacturing cast film, sheeting and the like of vinyl-type resins according to a continuous process comprising the steps of depositing a vinyl resin solution in the form of a film on a moving film-forming surface; at least partially drying the solution to solidify the film; frictionally engaging the film and subjecting it temporarily to a longitudinal tension sufficient to overcome its tendency to adhere to the film-forming surface; continuously supporting the film following its removal from the film-forming surface while the tension is temporarily maintained in said film; smoothing the film by the application of pressure thereto; releasing the tension on the film immediately before it is subjected to the smoothing step to restore it substantially completely to its original cast dimensions; and completing the drying of the film.

2. The method of manufacturing cast film, sheeting and the like of vinyl-type resins according to a continuous process comprising the steps of depositing a vinyl resin solution in the form of a film on a moving film-forming surface; at least partially drying the solution to solidify the film; frictionally engaging the solidified film at a point adjacent the end of its path of travel upon the moving film-forming surface to create in said film a longitudinal tension sufficient to overcome its adherence to the film-forming surface but without materially varying the lateral dimensions of the film; continuously supporting the film following its removal from the film-forming surface while the tension is temporarily maintained in said film; smoothing the film by the application of pressure thereto to remove wrinkles and other similar irregularities therefrom; releasing the tension induced in the film in its removal from the film-forming surface prior to the smoothing step and closely following its removal from the film-forming surface whereby it is restored substantially completely to its original cast dimensions; and completing the drying of the film.

ANDY J. SEITZ.

REFERENCES CITED

The following references are of record in the file of this patent:

UNITED STATES PATENTS

| Number | Name | Date |
|---|---|---|
| 2,260,501 | Wynd | Oct. 28, 1941 |
| 2,315,477 | Parkhurst | Mar. 30, 1943 |
| 2,241,225 | Talbot | May 6, 1941 |